United States Patent
Mahe et al.

(10) Patent No.: US 12,214,890 B2
(45) Date of Patent: Feb. 4, 2025

(54) PROPELLER PROPULSION UNIT FOR AN AIRCRAFT

(71) Applicant: Airbus Operations SAS, Toulouse (FR)

(72) Inventors: Mathieu Mahe, Toulouse (FR); Christophe Labarthe, Toulouse (FR); Frederic Journade, Toulouse (FR); Frédéric Vinches, Toulouse (FR); Franck Alvarez, Toulouse (FR); Lionel Czapla, Toulouse (FR); Emmanuel Vardelle, Toulouse (FR); Rémi Amargier, Toulouse (FR); Kotaro Fukasaku, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 11 days.

(21) Appl. No.: 18/355,779

(22) Filed: Jul. 20, 2023

(65) Prior Publication Data
US 2024/0025553 A1    Jan. 25, 2024

(30) Foreign Application Priority Data
Jul. 22, 2022   (FR) ..................................... 2207562

(51) Int. Cl.
| | |
|---|---|
| *B64D 27/40* | (2024.01) |
| *B64D 27/24* | (2006.01) |
| *B64D 27/30* | (2024.01) |
| *B64D 27/355* | (2024.01) |
| *B64D 41/00* | (2006.01) |
| *H01M 8/2465* | (2016.01) |

(52) U.S. Cl.
CPC ............. *B64D 27/24* (2013.01); *B64D 27/30* (2024.01); *B64D 27/355* (2024.01); *H01M 8/2465* (2013.01); *B64D 27/402* (2024.01); *B64D 2041/005* (2013.01); *H01M 2250/20* (2013.01)

(58) Field of Classification Search
CPC ...... B64D 27/24; B64D 27/402; B64D 27/30; B64D 27/355; B64D 2041/005; H01M 8/2465; H01M 2250/20
See application file for complete search history.

(56) References Cited

U.S. PATENT DOCUMENTS

| | | | |
|---|---|---|---|
| 6,131,848 | A | 10/2000 | Crow |
| 2007/0145182 | A1 | 6/2007 | Page |
| 2008/0053099 | A1 | 3/2008 | Venkataramani et al. |
| 2015/0336680 | A1 | 11/2015 | Schumacher et al. |

(Continued)

OTHER PUBLICATIONS

French Search Report for corresponding French Patent Application No. 2207562 dated Feb. 17, 2023; priority document.

(Continued)

*Primary Examiner* — Rodney A Bonnette
(74) *Attorney, Agent, or Firm* — Greer, Burns & Crain, Ltd.

(57) ABSTRACT

A propulsion unit, for an aircraft, comprising a hollow chassis with an opening at the bottom, a propulsion system comprising an electric motor with a propeller, a fuel cell, a tank and a cooling system, and one platform fastened to the chassis through said opening using fasteners and in which at least one element of the propulsion system is fastened to the platform. An aircraft with such a propulsion unit.

11 Claims, 6 Drawing Sheets

(56) References Cited

U.S. PATENT DOCUMENTS

| | | | | |
|---|---|---|---|---|
| 2018/0223944 A1* | 8/2018 | Shahosseini | ........... | B64D 27/12 |
| 2019/0009918 A1* | 1/2019 | Zameroski | ............. | B64D 27/40 |
| 2020/0385131 A1* | 12/2020 | Deforet | ................ | B64D 27/404 |
| 2021/0078719 A1 | 3/2021 | Thomas et al. | | |
| 2022/0371743 A1* | 11/2022 | Allain | .................... | B64D 37/30 |
| 2023/0415906 A1* | 12/2023 | Fukasaku | ................ | B64D 27/24 |
| 2024/0002064 A1* | 1/2024 | Czapla | ................. | B64D 27/402 |
| 2024/0308681 A1* | 9/2024 | Vincekovic | ............ | B64D 37/30 |

OTHER PUBLICATIONS

G. Gardiner, "Carbon Fiber in Pressure Vessels for Hydrogen" download from https://www.compositesworld.com/articles/cfrp-pressure-vessels-for-hydrogen; published Oct. 23, 2020.

* cited by examiner

PROPELLER PROPULSION UNIT FOR AN AIRCRAFT

CROSS-REFERENCES TO RELATED APPLICATIONS

This application claims the benefit of French Patent Application Number 2207562 filed on Jul. 22, 2022, the entire disclosure of which is incorporated herein by way of reference.

FIELD OF THE INVENTION

The present invention relates to a propeller propulsion unit for an aircraft, said propulsion unit comprising a chassis fastened to a structure of a wing surface of the aircraft and a propulsion system comprising at least one platform carrying at least one piece of equipment, in which the chassis has an opening in the bottom and in which the platform is fastened to the chassis through said opening. The invention also relates to an aircraft comprising at least one such propulsion unit.

BACKGROUND OF THE INVENTION

In order to move, an aircraft conventionally has at least one propulsion unit comprising a propulsion system arranged in a nacelle. The propulsion system comprises a chassis, a motor fastened to the chassis, and a propeller driven in rotation by the motor. The chassis of the nacelle is fastened beneath a pylon, which is in turn fastened beneath a structure of the wing surface of the aircraft.

The propulsion system, and more specifically the motor, comprises numerous elements that are fastened either to the pylon or to the chassis, and these elements are usually interlocked in a complex manner inside the chassis.

During maintenance operations on the propulsion unit, disassembly of the elements can be complex, since the elements to be checked can be fastened behind other elements, which have to be disassembled to access the elements to be checked.

SUMMARY OF THE INVENTION

One purpose of the present invention is to provide a propulsion unit that allows easy disassembly and reassembly of the elements making up the propulsion system.

For this purpose, a propulsion unit is proposed for an aircraft comprising:
  a hollow chassis with an opening in the bottom,
  a propulsion system comprising the following propulsion elements: an electric motor with a drive shaft bearing a propeller, a fuel cell providing electrical power to the electric motor, a tank feeding hydrogen gas to the fuel cell, and a cooling system, and
  at least one platform, in which said or each platform is fastened to said chassis using fasteners and closes said opening and in which at least one propulsion element of the propulsion system is fastened to said or each platform.

This arrangement makes it easy to dismantle each platform from the underside of the chassis during maintenance operations.

Advantageously, the chassis comprises a plurality of arches arranged one after the other and, between two successive arches, beams fastened at the ends to the two successive arches, in which each arch is open at the bottom, and in which, for two successive arches, the two port-side lower ends of the two arches are linked by a lower beam and the two starboard-side lower ends of the two arches are linked by another lower beam.

Advantageously, the fastener is a two-legged yoke, each leg having a bore and being rigidly connected to the platform, a tab rigidly connected to the chassis that has a spherical bore containing a sphere, which is in turn traversed by a bore, and a bolt with a threaded stem that passes through each bore.

Advantageously, the fastener is a first tab that contains a bore and is rigidly connected to the platform, a second tab that contains a bore and is rigidly connected to the chassis, a block made of a flexible material, two threaded stems rigidly connected to said block and arranged coaxially with one another on both sides of the block, and a nut for each threaded stem that is tightened against the corresponding tab.

Advantageously, the fastener is a connecting rod with three fastening points, in which each fastening point enables rotation about an axis parallel to a transverse direction of the propulsion unit, in which the connecting rod is fastened by two fastening points to the platform and by one fastening point to the chassis.

Advantageously, the fastener is a connecting rod with three fastening points, in which each fastening point enables rotation about an axis parallel to a longitudinal direction of the propulsion unit, in which the connecting rod is fastened by two fastening points to the platform and by one fastening point to the chassis.

Advantageously, said propulsion unit comprises a nacelle made of cowlings, and the fasteners also fasten the cowlings to the chassis.

Advantageously, said propulsion unit comprises additional fasteners that directly fasten the cowlings to the platform.

Advantageously, the platform is made of several sub-platforms arranged one behind the other in a longitudinal direction of the propulsion unit, and in which each sub-platform is fastened to the chassis using fasteners.

Advantageously, the electric motor with the propeller is carried by the frontmost sub-platform.

The invention also proposes an aircraft comprising at least one propulsion unit according to one of the preceding variants.

BRIEF DESCRIPTION OF THE DRAWINGS

The aforementioned and other features of the present invention are set out more clearly in the description given below of an example embodiment, said description being provided with reference to the fastened drawings, in which.

DETAILED DESCRIPTION OF THE PREFERRED EMBODIMENTS

Figure 1:
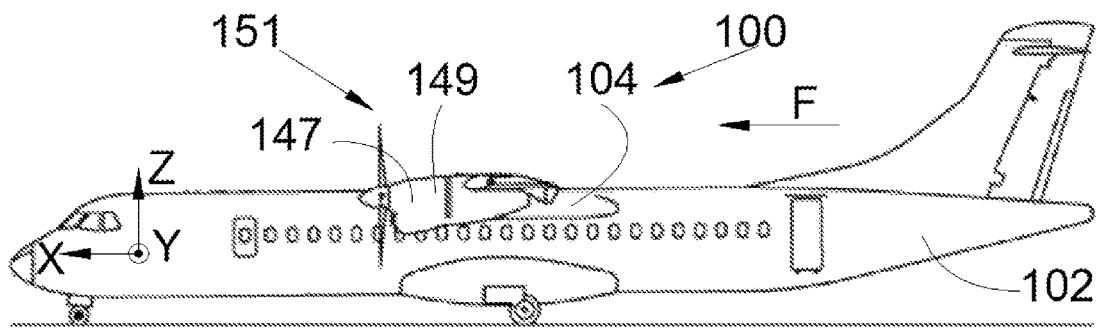
FIG. 1 is a side view of an aircraft comprising a propulsion unit according to the invention.

In the description below, terms relating to position refer to an aircraft moving forwards, i.e. as shown in FIG. 1, where the arrow F shows the direction of forward movement of the aircraft.

In the description below, and by convention, the longitudinal direction corresponding to the aircraft axis oriented positively forward in the direction of forward movement of the aircraft is referred to as X, the transverse direction that is horizontal when the aircraft is on the ground is referred to as Y, and the vertical direction or vertical height when the aircraft is on the ground is referred to as Z, and these three directions X, Y and Z are orthogonal to one another.

FIG. 1 shows an aircraft 100 with a fuselage 102 with a wing 104 fastened on each side. At least one propulsion unit 151, comprising a nacelle 149 made up of cowlings 147 forming an aerodynamic outer surface, is fastened beneath each wing 104.

Figure 2:
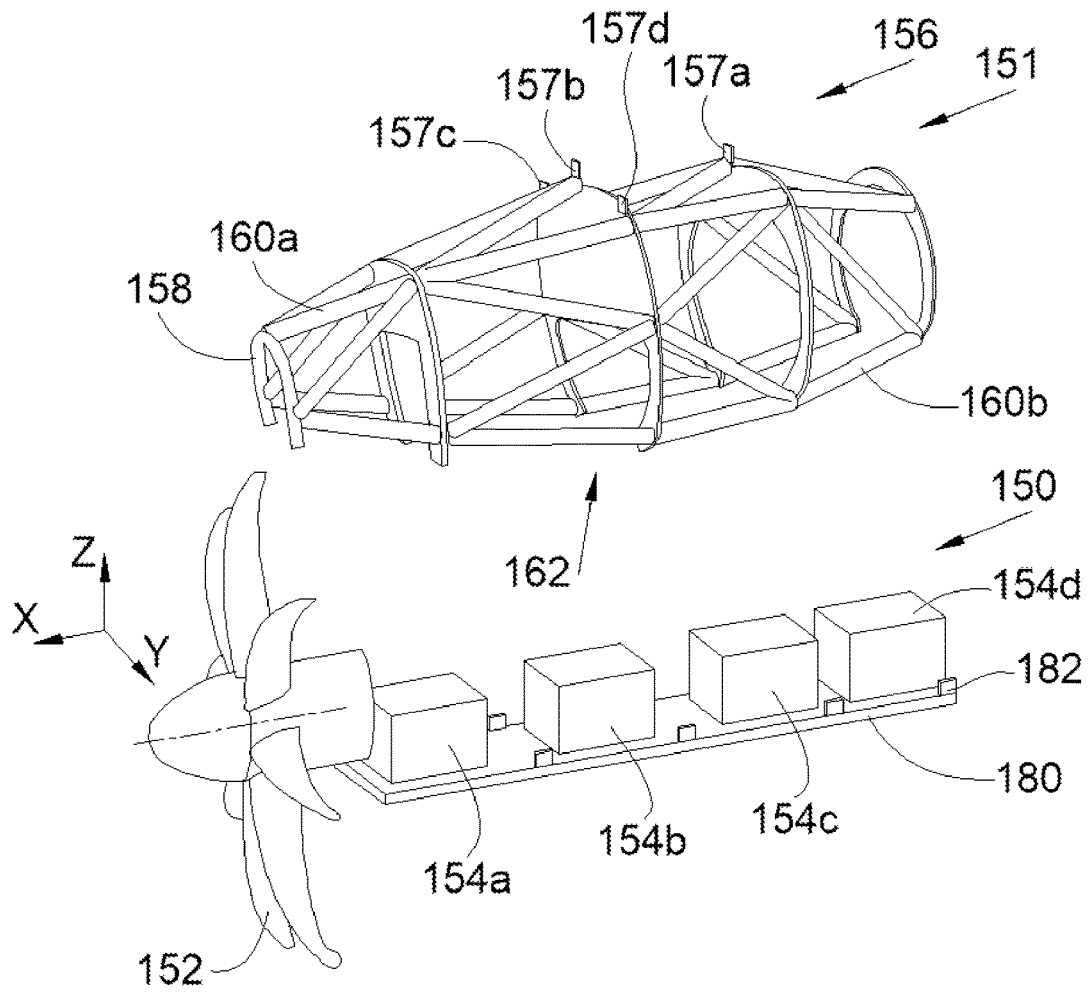
FIG. 2 is an exploded perspective view of a propulsion unit according to the invention.

FIG. 2 shows the propulsion unit 151 without the nacelle 149, which also includes a propulsion system 150, shown in an exploded view. The propulsion unit 151 has a longitudinal direction parallel to the longitudinal direction X of the aircraft 100, a transverse direction parallel to the transverse direction Y of the aircraft 100, and a vertical direction parallel to the vertical direction Z of the aircraft 100.

The propulsion system 150 comprises an electric motor 154a and a propeller 152 that is mounted on the shaft of the electric motor 154a and therefore driven in rotation by said electric motor 154a. The rotation axis of the propeller 152 is generally parallel to the longitudinal direction X.

The propulsion unit 151 also includes a chassis 156 extending parallel to the longitudinal direction X and comprising structural elements joined together to form a cage.

The chassis 156 forms a pylon fastened to a structure of the wing 104 by fastening points 157a-d arranged on the top of the chassis 156, of which there are four in this case. A rear fastening point 157a is provided at the rear of the chassis 156 and compensates for forces along Z. A front fastening point 157b is provided in front of the rear fastening point 157a, to compensate for the forces along Y. Two lateral fastening points 157c-d are provided on the two sides of the front fastening point 157b, each compensating for forces along X and Z. These different fastening points are not part of the invention and can take any form known to the person skilled in the art.

The structural elements of the chassis 156 comprise a plurality of arches 158, in this case five arches, arranged one after another in the longitudinal direction X and, between two successive arches 158, beams 160a-b fastened by the ends thereof to the two successive arches 158.

Each arch 158 is open at the bottom. For two successive arches 158, the two port-side lower ends of the two arches 158 are connected by a lower beam 160b and the two starboard-side lower ends of the two arches 158 are connected by another lower beam 160b. There is no beam connecting a port-side or starboard-side lower end of one arch 158 to a starboard-side or starboard-side lower end of the next arch 158, so as not to clutter the space.

Other beams 160a connect the arches 158 to each other, above the lower beams 160b, to form a confined, hollow space inside the chassis 156.

The lower beams 160b and the arches 158 form an opening 162 that is oriented downwards.

In the case of an aircraft 100 using a fuel cell, the propulsion system 150 also comprises a fuel cell 154b, a tank 154c containing hydrogen gas, and a cooling system 154d. Depending on the case, the propulsion system 150 may include other elements, such as air supply systems and the like.

The propulsion system 150 thus comprises the following propulsion elements: the electric motor 154a, the fuel cell 154b, the tank 154c, and the cooling system 154d.

Typically, the fuel cell 154b is supplied with air and hydrogen gas from the tank 154c to generate electricity for the electric motor 154a. The cooling system 154d is designed to cool the various different elements of the propulsion system 150. These different elements 154a-d are known to the person skilled in the art and are not described in greater detail. The various different cables, pipes, and the like that connect the various different elements 154a-d together are not shown.

The propulsion unit 151 also includes at least one platform 180, to which at least one propulsion element 154a-d of the propulsion system 150 is fastened by any suitable means, such as screws, welds, etc.

According to the invention, the at least one or each platform 180 is fitted with at least one propulsion element 154a-d installed in the chassis 156 from below through the opening 162 and is fastened to said chassis 156 by fasteners 182. Each fastener 182 fastens the platform 180 to an arch 158 or a beam 160a-b. The fasteners 182 are distributed on the port and starboard sides of the platform 180, and this arrangement also provides structural reinforcement for the chassis 156.

Thus, in general, the chassis 156 forms a cage which is hollow and has an opening 162 in the bottom through which the or each platform 180 fitted with at least one propulsion element 154a-d is fastened, enabling the or each platform 180 to be inserted and removed through said opening 162 during maintenance operations and wherein the or each platform 180 closes said opening 162 when it is in place.

This makes assembly and disassembly of the elements 154a-d easier than in the prior art. The at least one or each platform 180 fitted with at least one propulsion element 154a-d is moved upwards during assembly and downwards during disassembly.

In the embodiment of the invention shown in FIG. 1, all of the propulsion elements 154a-d of the propulsion system 150 are carried on a single platform 180.

Figure 3:
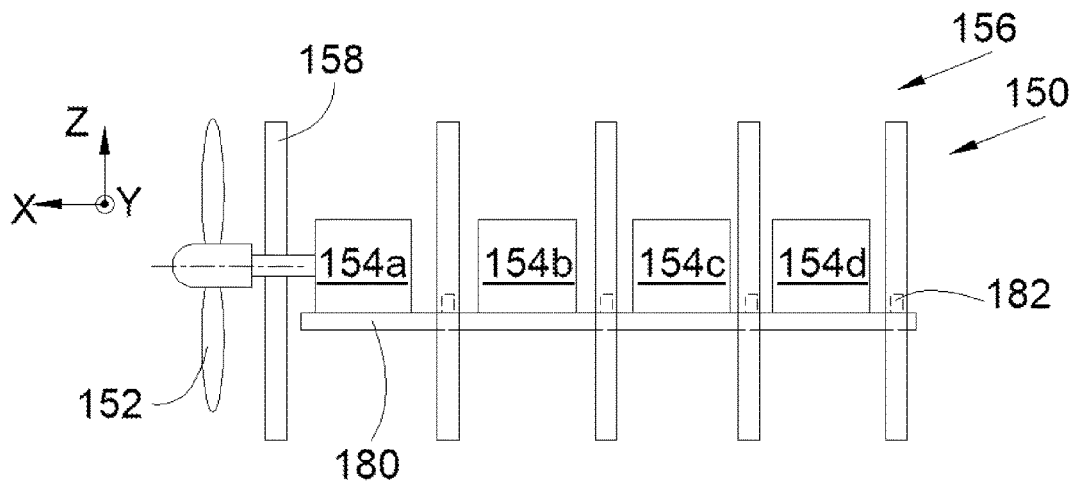
FIG. 3 is a schematic side view of a propulsion unit according to a first embodiment of the invention, with a platform according to a first variant of the invention.

FIG. 3 is a schematic view of the first embodiment of the invention with a single platform 180 in which each of the fasteners 182 (shown here with dotted lines) is fastened between the platform 180 and the arches 158. In this embodiment, there are four fasteners 182 on the port side and four fasteners on the starboard side, distributed along the length of the platform 180.

Figure 4:
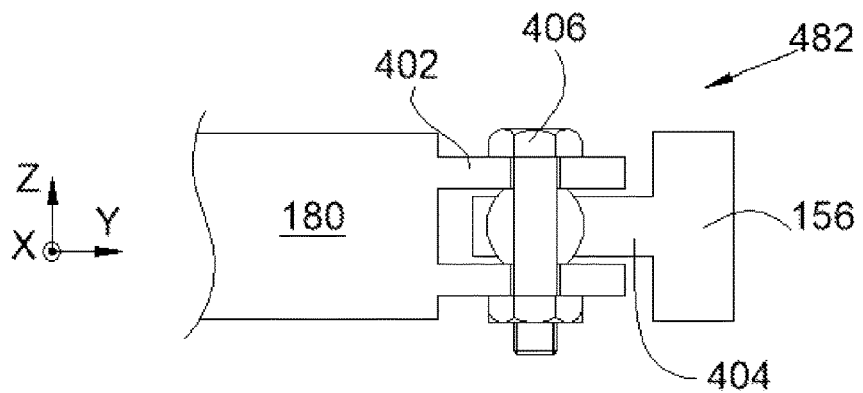
FIG. 4 is a cross-section view of a fastening system according to a first embodiment of the invention.
Figure 5:
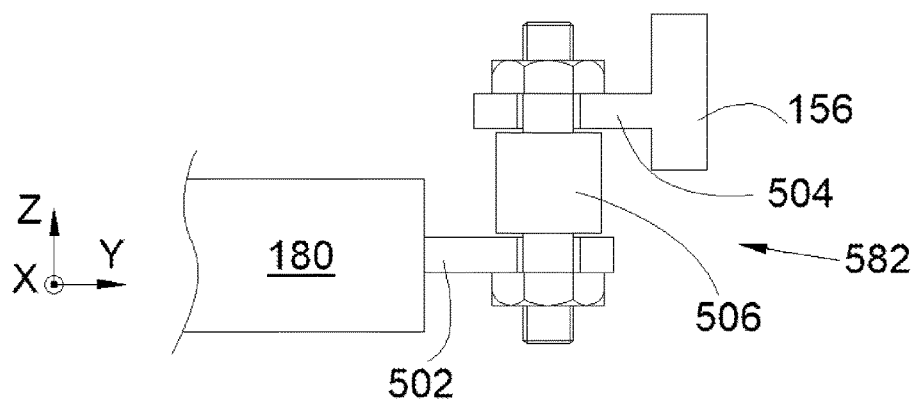
FIG. 5 is a cross-section view of a fastening system according to a second embodiment of the invention.

Each fastener 182 can be a rigid system, such as a nut/bolt system or connecting rods, or a flexible system. FIG. 4 and FIG. 5 show two specific embodiments of flexible systems that filter vibrations.

In FIG. 4, the fastener 482 is a two-legged yoke 402 rigidly connected to the platform 180 and a tab 404 rigidly connected to the chassis 156, i.e. to an arch 158 or to a beam 160a-b. The tab 404 has a spherical bore containing a sphere, which is in turn traversed by a bore. The tab 404 is inserted into the yoke 402 and the fasteners 482 also include a bolt 406 that passes through each lug of the yoke 402 through the bores provided for this purpose and the sphere through the bore provided for this purpose. The threaded stem of then bolt 406 then passes through each bore, and the head of the bolt and the nut bear against the legs of the yoke 402. The sphere creates a ball joint coupling between the chassis 156 and the platform 180. The fasteners 482 transfer loads along X, Y and Z.

In FIG. 5, the fastener 582 is a first tab 502 rigidly connected to the platform 180 and a second tab 504 rigidly connected to the chassis 156, i.e. to an arch 158 or to a beam 160a-b. The first tab 502 and the second tab 504 each have a bore, and the fastener 582 is a block 506 made of a flexible material such as rubber, and two threaded stems rigidly connected to said block 506 and arranged coaxially with respect to each other on both sides of the block 506. Each threaded stem is seated in one of the bores of the tabs 502 and 504 and receives a nut that is tightened against the corresponding tab 502, 504. The fasteners 582 transfer loads along X, Y and Z.

Figure 6:
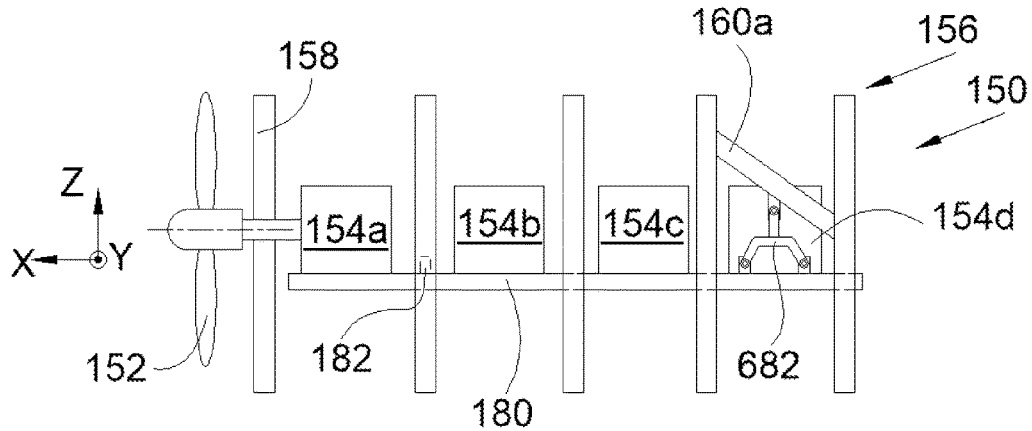
FIG. 6 is a schematic side view of a propulsion unit according to a second embodiment of the invention.

FIG. 6 shows a second embodiment in which the platform 180 is fastened to the chassis 156 by two fasteners 182 to the front (one on the port side and one on the starboard side) and by two fasteners 682 to the rear (one on the port side and one on the starboard side).

The fasteners 182 to the front may be rigid or flexible, as shown in FIGS. 4 and 5 and transfer loads along X, Y and Z.

Each fastener 682 to the rear is a connecting rod with three fastening points in which each fastening point enables rotation about an axis parallel to the transverse direction of the propulsion unit 151, i.e. horizontal and perpendicular to the longitudinal direction. The connecting rod is fastened by two fastening points to the platform 180 and by one fastening point to the chassis 156, in this case to a beam 160a. Each fastener 682 transfers loads along X and Z. An inverse assembly is naturally possible with two fastening points on the chassis 156 and one fastening point on the platform 180.

Figure 7:
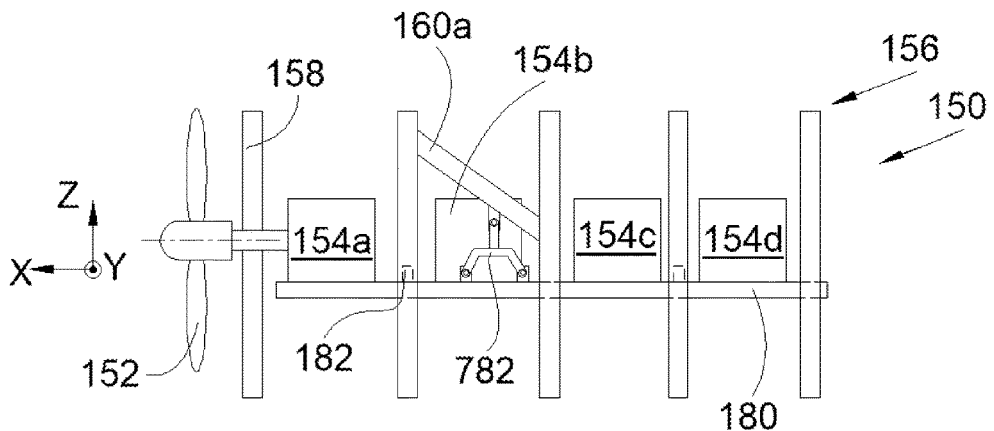
FIG. 7 is a schematic side view of a propulsion unit according to a third embodiment of the invention.

FIG. 7 shows a third embodiment in which the platform 180 is fastened to the chassis 156 by two pairs of fasteners 182, one pair to the front and one pair to the rear, each pair having one fastener 182 on the port side and one fastener on the starboard side. The fastening is completed by two fasteners 782 (one on the port side and one on the starboard side) between the front pair and the rear pair.

The fasteners 182 to the front and to the rear may be rigid or flexible, as shown in FIGS. 4 and 5, and transfer loads along X, Y and Z.

Each intermediate fastener 782 is a connecting rod with three fastening points in which each fastening point enables rotation about an axis parallel to the transverse direction of the propulsion unit 151, i.e. horizontal and perpendicular to the longitudinal direction. The connecting rod is fastened by two fastening points to the platform 180 and by one fastening point to the chassis 156, in this case to a beam 160a. Each fastener 782 transfers loads along X and Z. An inverse assembly is naturally possible with two fastening points to the chassis 156 and one fastening point to the platform 180.

Figure 8:
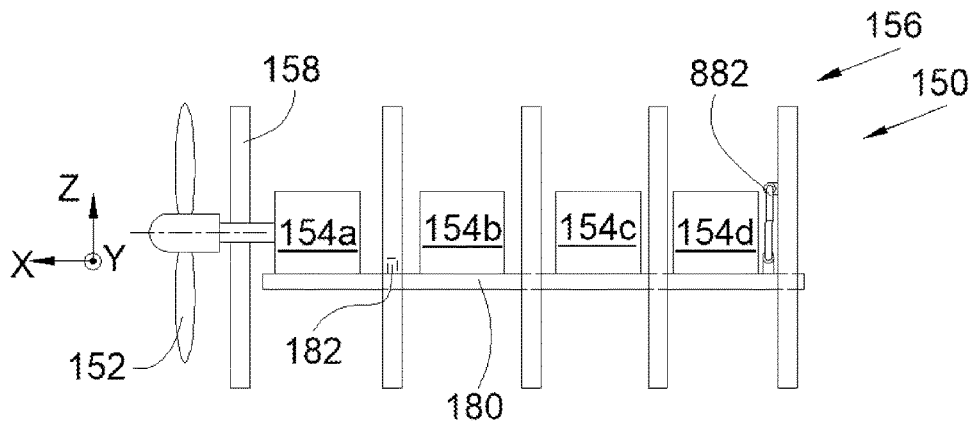
FIG. 8 is a schematic side view of a propulsion unit according to a fourth embodiment of the invention.

FIG. 8 shows a fourth embodiment in which the platform 180 is fastened to the chassis 156 by two fasteners 182 to the front (one on the port side and one on the starboard side) and by one fastener 882 to the rear.

The fasteners 182 to the front may be rigid or flexible, as described in FIGS. 4 and 5 and transfer loads along X, Y and Z.

The fastener 882 to the rear is a connecting rod with three fastening points in which each fastening point enables rotation about an axis parallel to the longitudinal direction of the propulsion unit 151. The connecting rod is fastened by two fastening points to the platform 180 and by one fastening point to the chassis 156. The fastener 882 transfers loads along Y and Z. An inverse assembly is naturally possible with two fastening points to the chassis 156 and one fastening point to the platform 180.

Figure 9:
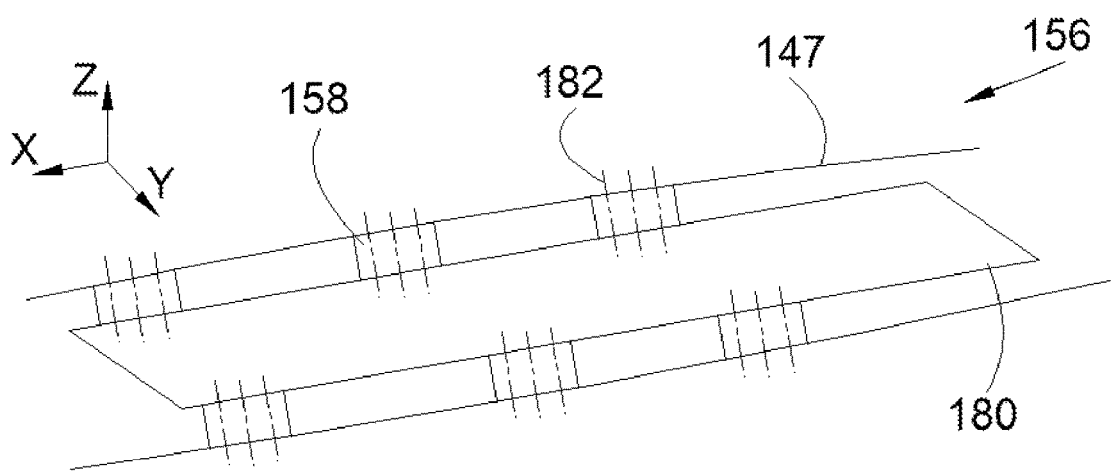
FIG. 9 is a schematic cross-section view through a horizontal plane of the propulsion unit according to one variant of the invention.

In the embodiment of the invention shown in FIG. 9, the platform 180 is fastened to the chassis 156, shown here by the arches 158, by fasteners 182 that are in this case rivets or screws, such as a nut/bolt system, which simultaneously fasten the platform 180 and the cowlings 147 of the nacelle 149 to the chassis 156.

The platform 180 is thus seated inside the chassis 156 and the cowlings 147 are outside the chassis 156.

Figure 10:
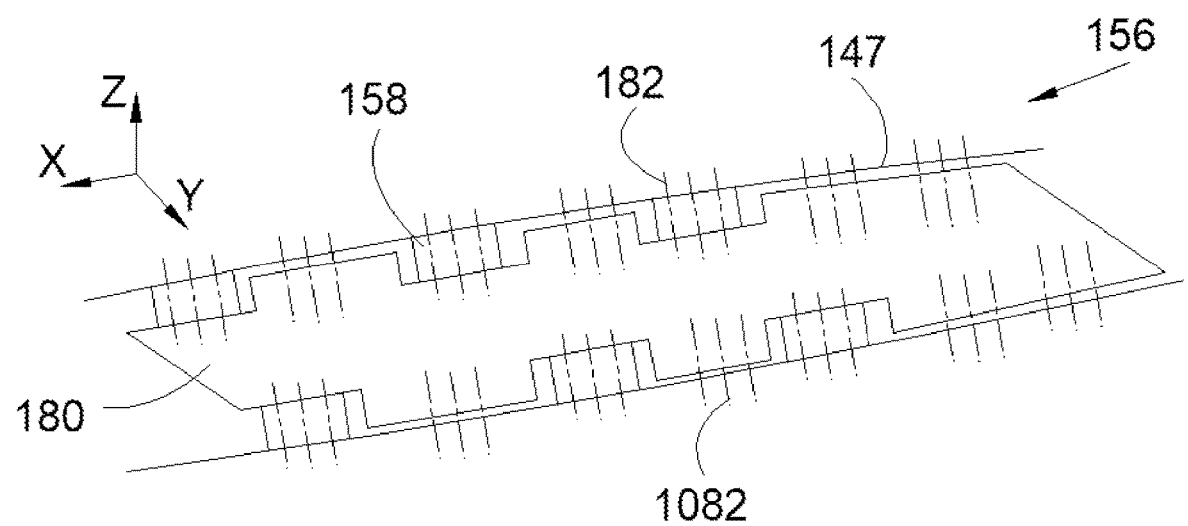
FIG. 10 is a schematic cross-section view through a horizontal plane of the propulsion unit according to another variant of the invention.

In the embodiment of the invention shown in FIG. 10, the platform 180 and the cowlings 147 of the nacelle 149 are fastened to the chassis 156, shown here by the arches 158, by fasteners 182 that are in this case rivets or screws, such as a nut/bolt system, which simultaneously fasten the platform 180 and the cowlings 147 of the nacelle 149 to the chassis 156. The propulsion unit 151 also includes additional fasteners 1082 that directly fasten the cowlings 147 to the platform 180, and that in this case are also rivets or screws, such as a nut/bolt system.

In the embodiments described above, there is a single platform 180. In the embodiments in FIGS. 11 to 13, each platform 180 is made up of several sub-platforms, which are separate from one another in FIGS. 11 and 12 and connected to one another in FIG. 13. Each sub-platform is fastened to the chassis 156 by fasteners 182.

Figure 11:
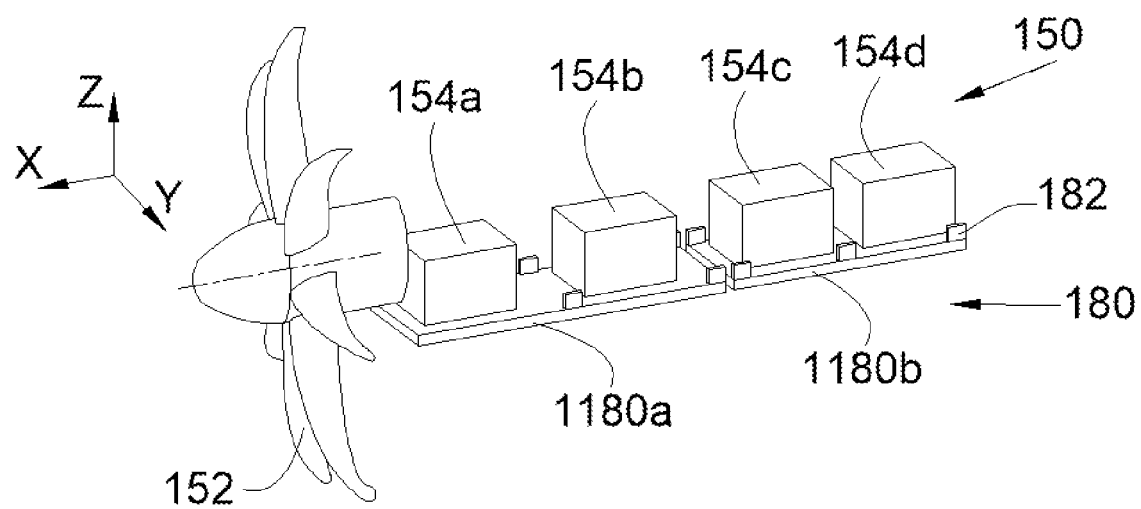
FIG. 11 is a schematic view of a platform according to a second variant of the invention.
Figure 12:
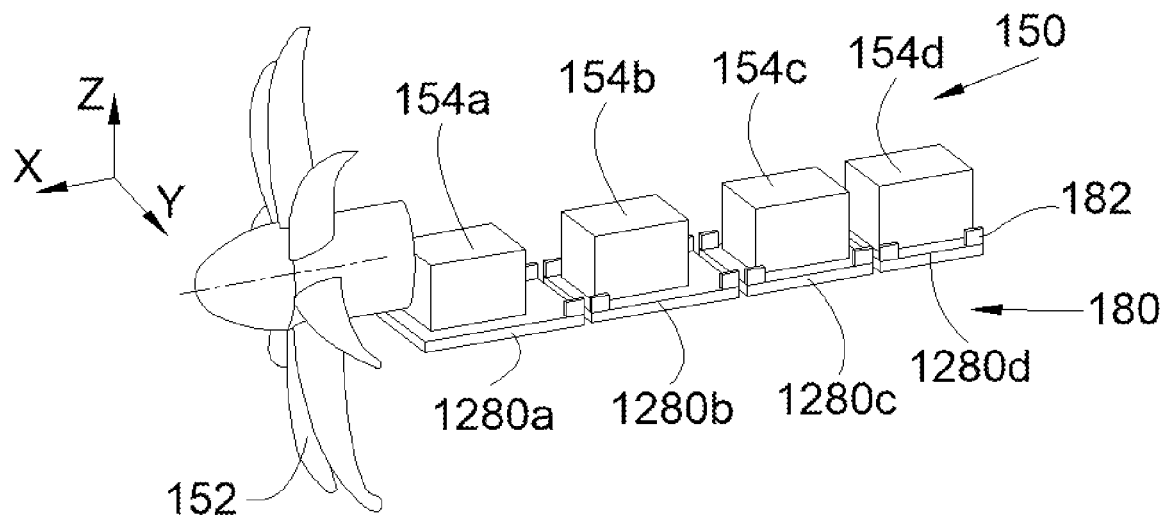
FIG. 12 is a schematic view of a platform according to a third variant of the invention.
Figure 13:
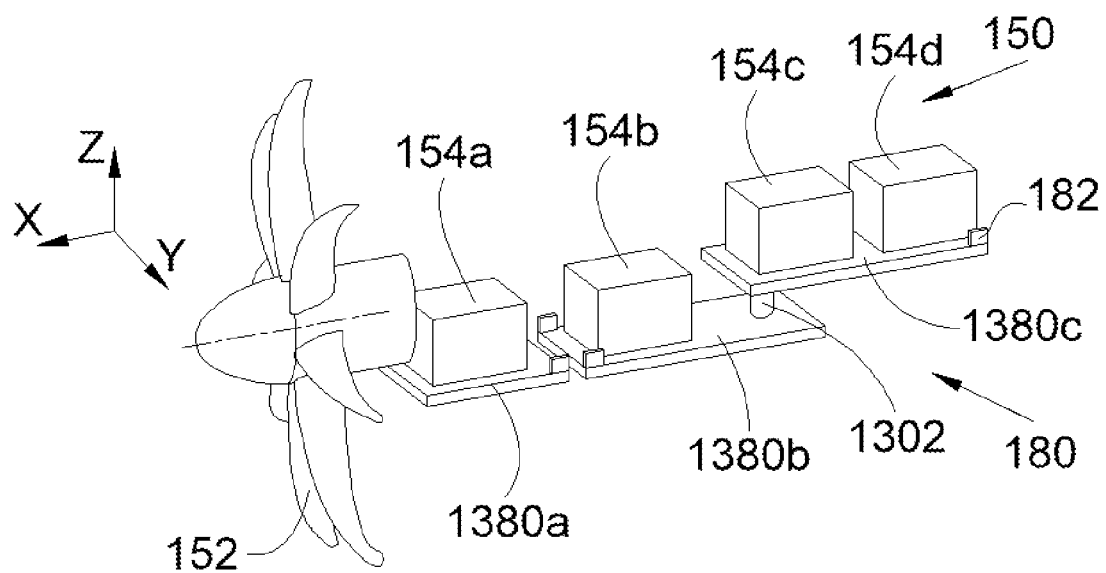
FIG. 13 is a schematic view of a platform according to a fourth variant of the invention.

In FIGS. 11 to 13, the fasteners 182 shown are arranged in pairs with one fastener 182 on the port side and one fastener on the starboard side of each sub-platform, similarly to the fasteners 482, 582 described in FIGS. 4 and 5, but each fastener can have a different layout and shape and take other forms, such as those described in FIGS. 6 to 10.

In the embodiment of the invention shown in FIG. 11, the platform 180 comprises two sub-platforms 1180a-b that are separate from one another and arranged one behind the other in the longitudinal direction. At least one propulsion element 154a-d of the propulsion system 150 is fastened to each sub-platform 1180a-b.

In the embodiment of the invention shown in FIG. 12, the platform 180 comprises four sub-platforms 1280a-d that are separate from one another and arranged one behind the other in the longitudinal direction. At least one propulsion element 154a-d of the propulsion system 150 is fastened to each sub-platform 1280a-d.

There may naturally be any number of sub-platforms, apart from two or four. In the embodiment of the invention shown in FIG. 13, the platform 180 comprises three sub-platforms 1380a-c that are arranged one behind the other in the longitudinal direction. At least one propulsion element 154a-d of the propulsion system 150 is fastened to each sub-platform 1380a-c. The sub-platform 1380a is separate from the other sub-platforms 1380*b-c*, while the other two sub-platforms 1380*c-d* are linked together by a vertical-axis pivot link 1302.

Among other things, separating the platform 180 into several sub-platforms separates the most vibration-generating elements 154*a-d* from the other elements, in particular sensitive elements. In this case, the element generating the most vibrations is the electric motor 154*a* with the propeller 152, and this element is carried by the frontmost sub-platform.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propulsion unit for an aircraft comprising:
    a hollow chassis with an opening in the bottom,
    a propulsion system comprising the following propulsion elements: an electric motor with a drive shaft bearing a propeller, a fuel cell providing electrical power to the electric motor, a tank feeding hydrogen gas to the fuel cell, and a cooling system, and
    at least one platform, wherein the at least one platform is fastened to said chassis using fasteners and closes said opening, and
    wherein at least one propulsion element of the propulsion system is fastened to the at least one platform.

2. The propulsion unit according to claim 1, wherein the hollow chassis further comprises a plurality of arches arranged one after the other and, between two successive arches, beams fastened at ends to the two successive arches,
    wherein each arch is open at the bottom, and
    wherein, for two successive arches, two port-side lower ends of the two successive arches are linked by a lower beam and two starboard-side lower ends of the two successive arches are linked by another lower beam.

3. The propulsion unit according to claim 1, wherein the fasteners each comprise a two-legged yoke, each leg having a bore and being rigidly connected to the platform, a tab rigidly connected to the chassis that has a spherical bore containing a sphere, which is in turn traversed by a bore, and a bolt with a threaded stem that passes through each bore.

4. The propulsion unit according to claim 1, wherein the fasteners each comprise a first tab that contains a bore and is rigidly connected to the platform, a second tab that contains a bore and is rigidly connected to the chassis, a block made of a flexible material, two threaded stems rigidly connected to said block and arranged coaxially with one another on both sides of the block, and a nut for each threaded stem that is tightened against the corresponding tab.

5. The propulsion unit according to claim 1, wherein each fastener comprises a connecting rod with three fastening points, in which each fastening point enables rotation about an axis parallel to a transverse direction of the propulsion unit,
    wherein the connecting rod is fastened by two fastening points to the platform and by one fastening point to the chassis.

6. The propulsion unit according to claim 1, wherein each fastener comprises a connecting rod with three fastening points, in which each fastening point enables rotation about an axis parallel to a longitudinal direction of the propulsion unit,
    wherein the connecting rod is fastened by two fastening points to the platform and by one fastening point to the chassis.

7. The propulsion unit according to claim 1, further comprising:
    a nacelle having cowlings, and
    wherein the fasteners also fasten the cowlings to the chassis.

8. The propulsion unit according to claim 7, further comprising:
    additional fasteners that directly fasten the cowlings to the platform.

9. The propulsion unit according to claim 1, wherein the platform comprises a plurality of sub-platforms arranged one behind the other in a longitudinal direction of the propulsion unit, and
    wherein each sub-platform is fastened to the chassis using the fasteners.

10. The propulsion unit according to claim 9, wherein the electric motor with the propeller is carried by a frontmost sub-platform.

11. An aircraft comprising:
    the propulsion unit according to claim 1.

* * * * *